United States Patent

Knoerzer

Patent Number: 5,525,421
Date of Patent: Jun. 11, 1996

[54] METALLIZED COMPOSITE FILM STRUCTURE AND METHOD

[75] Inventor: Anthony R. Knoerzer, Plano, Tex.

[73] Assignee: Mobil Oil Corporation, Fairfax, Va.

[21] Appl. No.: 345,047

[22] Filed: Nov. 25, 1994

[51] Int. Cl.$^6$ ............................................. B32B 7/12
[52] U.S. Cl. .................. 428/347; 428/35.3; 428/35.8; 428/461; 428/520; 428/910
[58] Field of Search .................. 428/35.3, 35.8, 428/347, 520, 461, 910

[56] References Cited

U.S. PATENT DOCUMENTS

| | | | |
|---|---|---|---|
| 3,433,777 | 3/1969 | Brunson | 260/88.2 |
| 4,198,327 | 4/1980 | Matsumoto et al. | 260/4 |
| 4,345,005 | 8/1982 | All et al. | 428/461 |
| 5,153,074 | 10/1992 | Migliorini | 428/463 |
| 5,192,620 | 3/1993 | Chu et al. | 428/461 |

*Primary Examiner*—Edith Buffalow
*Attorney, Agent, or Firm*—Ronald A. Bleeker; Malcolm D. Keen; Laurence P. Hobbes

[57] ABSTRACT

A metallized film combination comprising an oriented polypropylene substrate layer, at least one surface of which having a coating of a vinyl alcohol homopolymer or copolymer hydrolyzed to at least 95% at a pH of greater than 5.0, said coating having a metal layer thereon. The high pH PVOH hydrolysis conditions provide a metallized product of high metal adhesion and good water and oxygen barrier properties.

20 Claims, No Drawings

METALLIZED COMPOSITE FILM STRUCTURE AND METHOD

BACKGROUND OF THE INVENTION

The invention relates to a multi-layer film structure having a metallized surface.

The bonding of metals, such as, aluminum, silver, chromium, etc., to plastic films has allowed such films to replace metallic foils in many instances. The flexibility of the films necessitates the formation of a strong metal-plastic bond, and a number of approaches have been developed for providing such bonding.

In U.S. Pat. No. 4,345,005, the disclosure of which is incorporated herein by reference in its entirety, a homopolymer polypropylene core layer is coextruded with an ethylene propylene copolymer. The film is biaxially oriented and the copolymer layer is corona discharge treated. Thereafter, a metal coating is deposited onto the corona discharge treated layer by any suitable process such as, vacuum deposition. In order to enhance adhesion between the metal and plastic film, neither the core layer or outer layer(s) contain a slip agent in an amount which would deleteriously affect the metal/polymer bond. The resulting product has utility in flexible packaging. Polypropylene film employed for packaging purposes inherently permits the transmission of oxygen and water vapor from the outside of the film to the inside of package made up of the film. Oxygen and water vapor promote rapid deterioration of foods packaged in such a container, therefore, its exclusion or control is desired.

U.S. Pat. No. 5,192,620 to Chu et al, incorporated herein by reference discloses a metallized film combination having an oriented polypropylene substrate layer having on one surface a coating of a blend of (a) a vinyl alcohol homopolymer or copolymer, and (b) an ethylene-acrylic acid copolymer as metal-adhesion promoting agent, the coating blend having a metal layer thereon. However, it would be advantageous to provide a coating of vinyl alcohol homopolymer or copolymer without additional components because of the desired oxygen barrier properties of vinyl alcohol polymers.

U.S. patent application Ser. No. 08/258,316, filed Jun. 10, 1994 discloses a metallized multilayer film comprising a polypropylene substrate modified by a maleic anhydride modified propylene polymer, which can be located on a surface of the substrate having a skin layer of polyvinyl alcohol which is capable of being metallized.

It is an object of the present invention to present a metallized film and a method of forming the same which has a decreased oxygen transmission and water vapor transmission rate.

SUMMARY OF THE INVENTION

In accordance with the present invention, a metallized film combination comprises an oriented propylene substrate layer which in its unmodified form is susceptible of transmitting oxygen and moisture, at least one surface of which having a coating of a vinyl alcohol homopolymer or copolymer hydrolyzed to at least 86% at a pH of greater than 5.0, say, a pH ranging from 5.5 to 6.5; and said coating having a metal layer thereon.

The invention is also concerned with a method of forming a metallized film combination comprising:

(a) providing a polypropylene substrate film;

(b) applying to said substrate film an oxygen barrier coating consisting essentially of a vinyl alcohol homopolymer or copolymer hydrolyzed to at least 86% at a pH of greater than 5.0; and (c) metallizing the vinyl alcohol homopolymer or copolymer surface formed in step (b).

Before the oxygen barrier coating is applied to the oriented film it is preferred to corona discharge treat the substrate surface for improved surface wettability and apply a polyethyleneimine (PEI) primer.

DESCRIPTION OF PREFERRED EMBODIMENTS

The multilayer film structure of this invention comprises a substrate of polyolefin, typically polypropylene. Particularly preferred are isotactic polypropylenes containing at least 80% by weight of isotactic polypropylene. The preferred base substrate layer can be a homopolymer-propylene having a melting point range of from about 321° to about 336° F. A commercially available material of this description is Exxon 4252 or Fina 3378. Copolymers of propylene with another alpha olefin, preferably ethylene can also be employed. The preferred polypropylene matrix material has the following characteristics: density of 0.91 g.cc; melting point of 160° C. or higher; melt flow rate of 2 to 4.

The polyolefin substrate can be modified by a maleic anhydride modified polypropylene. The maleic anhydride modified polypropylene skin layer can be prepared by any process, for example, the process disclosed in U.S. Pat. Nos. 3,433,777 and 4,198,327, the disclosures of which are incorporated herein by reference in their entireties. A simple process for its preparation is described in U.S. Pat. No. 5,153,074. The maleic anhydride modified polypropylene can also be interblended into the substrate, by melt blending it with the substrate polyolefin or it can be coextruded with the substrate polymer. A commercially available maleic anhydride modified polypropylene or propylene copolymer has the following physical characteristics: density of 0.90 (ASTM D1505), Vicat softening point of 143° C. (ASTM D1525); Shore hardness of 67 (ASTM 2240); melting point of 160° C. (ASTM D2117). The maleic anhydride modified polypropylene acts as a tie layer which further adheres the substrate to the PVOH. Maleic anhydride modified polypropylene is sold commercially by a variety of sources, e.g. it is sold under the tradename "ADMER" by Mitsui, "BYNEL" by DuPont, and "PLEXAR" by Quantum.

The substrate or modified substrate can be stretched at least in the machine direction 4 to 7 times and then corona treated prior to applying the PVOH; the web is then TD stretched 4 to 10 times. Alternatively, the polypropylene substrate can be biaxially oriented (MD: 4–7 times, TD: 5–12 times) prior to applying PVOH.

A layer of polyvinyl alcohol (PVOH) is applied to the surface of the substrate or modified substrate. In instances where the substrate is coextruded with the maleic anhydride modified polypropylene, it is preferred to apply the PVOH to the modified surface in order to optimize adhering of the PVOH to the substrate.

The PVOH can be applied in a thin layer by any effective process. The layer can range in thickness from 0.01 mil to 0.20 mil. Three processes of note are 1) applying the PVOH by in-line coating between the machine direction and transverse direction orientation steps (which requires the use of a tie layer; 2) applying the PVOH to an MD and TD stretched film that has a tie layer, the PVOH being applied by reverse direct gravure coating; and 3) using no tie layer but applying a PEI-based primer prior to application of the PVOH by reverse direct gravure coating.

For extrusion coating and co-lamination, it is preferable to corona or flame treat the bonding surface of the substrate prior to application of the PVOH.

A heat sealable film can be applied to the substrate on the side opposite to the PVOH. This can be accomplished by coextruding a heat sealable polymer, copolymer or trimer, such as ethylene-propylene-butene, onto the substrate.

The grade of PVOH employed for the skin layer is critical to the present invention. In general, the PVOH is at least partially hydrolyzed to at least 86%, preferably at least 99%. Hydrolysis is carried out at a pH of greater than 5, preferably at least 5.5. PVOH with 86% or higher, preferably at least 98%, hydroxyl content can be used. Commercial PVOH products suitable for use herein include Elvanol 71-30, available from DuPont, and Airvol 125 available from Air Products and Chemicals, Inc.

The PVOH skin of the resulting film composite is then metallized by deposition of a metal thereon. Any typical process for metallization known in the art can be employed. Typical metals contemplated are aluminum, copper, chromium, magnesium, nickel, zinc, tin, silver, gold, titanium, silicon, bismuth, etc., or any compound containing the foregoing metals or combination thereof. An aluminum coating, which is most typically employed, can be of a thickness which yields an optical density of about 1.5 to 3.5. The thickness of the aluminum coating needed to meet this optical density is, typically, from about 50 to 1000 angstroms. The PVOH surface adequately adheres to metal.

The advantages of using 100% PVOH in multilayer films, as disclosed herein are extensive. Since 100% PVOH is employed, the film is a better oxygen barrier than previous films made with PVOH copolymers or blends. We have also found that the surface properties provided by the PVOH are responsible for superior metal adhesion, ink printing and lamination. The surface tension of PVOH is high. Without flame or corona treatment, the surface tension is about 60 dyne/cm, as compared to the surface tension of polypropylene of 29 dyne/cm.

The metal coating can be applied to the composite film by any known method, such as, sputtering, vacuum deposition or electroplating. Vacuum deposition is a preferred method. The most frequently used coating metal is aluminum, although other metals such as gold, silver, chrome and copper are also contemplated.

A heat sealable layer which may be employed herein can be an ethylene propylene (EP) copolymer or an ethylene propylene butene-1 (EPB) terpolymer, which can be applied during coextrusion, or an acrylic type coating. The heat sealable layer is typically located on the side opposite the PVOH skin layer. The ratio of ethylene to propylene to butene-1 can be from 0 to 15% ethylene, 70 to 100% propylene and 0 to 15% butene-1; that is, 2% ethylene, 94% propylene and 4% butene-1.

A printable surface which is adhered to the metallized film by an adhesive such as low density polyethylene can be any polymer such as polyolefin homopolymer, copolymer or terpolymer, polycarbonate, polyester, etc. The characteristic of the printable surface is one with a surface free energy of 34 dynes/cm or higher.

As demonstrated in the following examples, the pH range at which PVOH solution is formulated to, prior to application as a coating has an important effect on the adhesion and barrier properties such as oxygen barrier (TO2) and water vapor transmission rate (WVTR) of the metallized film composite. It has been found that the higher pH ranges are critical to providing a metallized composite having sufficient metal adhesion (greater than 50 grams, preferably greater than 200 grams). Use of such pH ranges can further provide metallized films of high WVTR, e.g. 0.040 g/100 in$^2$/24 hr or less.

While metallization is accomplished in these examples by conventional vacuum deposition, it can also be accomplished by conventional vapor deposition.

EXAMPLES 1 TO 9

Aqueous coating dispersion of 5% solids was placed in a gravure coater, commonly known to one skilled in the art. The aqueous coating is composed of 80 parts by dry weight of Elvanol 71-30 PVOH, 15 phr of Parez 613 partially methylated melamine formaldehyde, and 5 phr of sulfuric acid. The aqueous coating dispersions were hydrolyzed to an extent of 99% for all nine examples at pHs ranging from 4.5 to 5 as shown in the Table.

Polypropylene homopolymer Exxon 4252 and an ethylene-propylene-butene-1 terpolymer skin resin containing 2000 ppm of erucamide slip were coextruded at a weight ratio of 97/3 through a flat sheet die at 250° C., cast onto a cooling drum and quenched at 30° C. The terpolymer skin on one side of the film provided a heat-seal layer. The coextruded sheet, measuring about 40 mil thick, was reheated to 140° C. and stretched 5-fold MD and 8-fold TD. Then it was corona discharge treated on the homopolymer side for improved surface wettability. The biaxially stretched film, measuring 1.0 mil, was corona discharge treated on one side. The aqueous coating was then applied to the corona treated homopolymer by Reverse Direct Gravure coating. The film was dried at 121° C.

The oxygen barrier (TO2) (at 0% and 75% relative humidity for unmetallized product, 75% relative humidity for metallized product) and water vapor transmission rate (WVTR) at 29° F., and 80% relative humidity for both unmetallized and metallized product were measured. Results are given below in the Table. WVTR was measured by a Mocon Permatran (ASTM F372), oxygen barrier by Mocon Oxtran (ASTM D 3985) and adhesion by tape test.

TABLE

| Ex. | pH* | TO2 0% RH (unmetallized) | TO2 75% RH (unmetallized) | TO2 75% RH (metallized) | WVTR (metallized) | Adhesion |
|---|---|---|---|---|---|---|
| 1 | 5.5 | 0.117 | 2.13 | 0.028 | 0.045 | Fair |
| 2 | 5.5 | 0.173 | 3.16 | 0.033 | 0.040 | Good |
| 3 | 5.0 | 0.050 | 3.05 | 0.014 | 0.043 | Good |
| 4 | 4.5 | 0.090 | 2.15 | 0.013 | 0.045 | Poor |
| 5 | 5.5 | 0.052 | 2.57 | 0.010 | 0.049 | Good |
| 6 | 4.5 | 0.103 | 2.06 | 0.008 | 0.061 | Poor |
| 7 | 5.0 | 0.061 | 3.15 | 0.010 | 0.056 | Poor |
| 8 | 5.0 | 0.037 | 3.77 | 0.007 | 0.050 | Fair |

TABLE-continued

| Ex. | pH* | TO2 0% RH (unmetallized) | TO2 75% RH (unmetallized) | TO2 75% RH (metallized) | WVTR (metallized) | Adhesion |
| --- | --- | --- | --- | --- | --- | --- |
| 9 | 4.5 | 0.036 | 3.00 | 0.011 | 0.065 | Poor |

WVTR in g/100 in$^2$/24 hr
TO2 in cc/100 in$^2$/24 hr
Good Adhesion is greater than 200 grams
Fair adhesion is greater than 50 grams, but less than 100 grams
*pH was adjusted by varying the amount of ammonia added to the formulation. The ammonia neutralizes the sulfuric acid.

What is claimed is:

1. A metallized film combination comprising an oriented polypropylene substrate layer, at least one surface of which having a coating of a vinyl alcohol homopolymer hydrolyzed to at least 95% at a pH of greater than 5.0; and said coating having a metal layer thereon.

2. The combination of claim 1 wherein said pH is at least 5.5.

3. The combination of claim 1 wherein said vinyl alcohol homopolymer is hydrolyzed to at least 99%.

4. The combination of claim 1 wherein one side of said polypropylene substrate carries a heat sealable layer.

5. The combination of claim 4 wherein said heat sealable layer is selected from the group consisting of copolymer of ethylene and propylene, terpolymer of ethylene, propylene and butene-1, and acrylic coating.

6. The combination of claim 1 wherein the other side of said polypropylene substrate is modified by a maleic anhydride grafted polypropylene homopolymer or copolymer.

7. The combination of claim 1 which has metal adhesion of greater than 50 grams, said metal being aluminum.

8. The combination of claim 2 which has metal adhesion of greater than 200 grams.

9. The combination of claim 2 which has a WVTR at 85° F., 80% relative humidity of 0.040 g/100 in$^2$/24 hr or less.

10. The combination of claim 1 wherein said pH ranges from 5.5 to 6.5.

11. A method of forming a metallized film combination comprising:

(a) providing a polypropylene substrate film;

(b) applying an oxygen barrier coating consisting essentially of a vinyl alcohol homopolymer hydrolyzed to at least 95% at a pH of greater than 5.0; and (c) metallizing the vinyl alcohol homopolymer surface formed in step (b).

12. The method of claim 11 wherein said pH is at least 5.5.

13. The method of claim 11 wherein said vinyl alcohol homopolymer is hydrolyzed to at least 99%.

14. The method of claim 11 wherein one side of said polypropylene substrate carries a heat sealable layer.

15. The method of claim 14 wherein said heat sealable layer is selected from the group consisting of copolymer of ethylene and propylene, terpolymer of ethylene, propylene and butene-1, and acrylic coating.

16. The method of claim 14 wherein the other side of said polypropylene substrate is modified by a maleic anhydride grafted polypropylene homopolymer or copolymer.

17. The method of claim 11 wherein said polypropylene substrate film is machine direction oriented prior to applying said oxygen barrier coating and transverse direction oriented prior to said metallizing.

18. The method of claim 11 wherein said polypropylene substrate film is machine direction oriented and transverse direction oriented prior to applying said oxygen barrier coating.

19. The method of claim 11 wherein said metallizing is carried out with aluminum.

20. The method of claim 11 wherein said pH ranges from 5.5 to 6.5.

* * * * *